US006861177B2

(12) United States Patent
Pinarbasi et al.

(10) Patent No.: US 6,861,177 B2
(45) Date of Patent: Mar. 1, 2005

(54) METHOD OF FORMING A READ SENSOR USING A LIFT-OFF MASK HAVING A HARDMASK LAYER AND A RELEASE LAYER

(75) Inventors: Mustafa Pinarbasi, Morgan Hill, CA (US); Ian Robson McFadyen, San Jose, CA (US); Alfred Floyd Renaldo, San Jose, CA (US); Randall George Simmons, San Jose, CA (US); Douglas Johnson Werner, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 330 days.

(21) Appl. No.: 10/080,303

(22) Filed: Feb. 21, 2002

(65) Prior Publication Data

US 2003/0157803 A1 Aug. 21, 2003

(51) Int. Cl.⁷ .......................... G03F 9/00; H01L 21/302; H01L 21/461
(52) U.S. Cl. ............................ 430/5; 430/296; 438/745
(58) Field of Search ................ 430/5, 296; 360/327.31; 438/745, 749–757

(56) References Cited

U.S. PATENT DOCUMENTS

| 4,838,994 | A | | 6/1989 | Gulde et al. |
| 5,018,037 | A | * | 5/1991 | Krounbi et al. ........ 360/327.31 |
| 5,491,600 | A | * | 2/1996 | Chen et al. ................ 360/322 |
| 6,001,734 | A | | 12/1999 | Drynan |
| 6,156,485 | A | | 12/2000 | Tang et al. |
| 6,159,863 | A | | 12/2000 | Chen et al. |
| 6,162,587 | A | | 12/2000 | Yang et al. |
| 6,184,142 | B1 | | 2/2001 | Chung et al. |
| 6,194,323 | B1 | | 2/2001 | Downey et al. |
| 6,211,044 | B1 | | 4/2001 | Xiang et al. |
| 6,218,056 | B1 | * | 4/2001 | Pinarbasi et al. .............. 430/5 |
| 6,218,078 | B1 | | 4/2001 | Iacoponi |
| 6,449,135 | B1 | * | 9/2002 | Ding et al. ............ 360/327.31 |
| 6,468,902 | B2 | * | 10/2002 | Kawai ........................ 438/667 |
| 6,493,926 | B2 | * | 12/2002 | Han et al. ................. 29/603.14 |
| 2002/0160613 | A1 | | 10/2002 | Sayama et al. |
| 2003/0182790 | A1 | * | 10/2003 | Hsiao et al. ............. 29/603.15 |

FOREIGN PATENT DOCUMENTS

| GB | 2331273 A | 5/1999 |
| JP | 57093526 | 6/1982 |
| JP | 2207418 | 8/1990 |
| JP | 2000252259 | 9/2000 |

* cited by examiner

*Primary Examiner*—Duy-Vu N. Deo
(74) *Attorney, Agent, or Firm*—John J. Oskorep, Esq.

(57) ABSTRACT

A method of forming a read sensor that has a very narrow track width is disclosed. The method involves forming a thin lift-off mask over a central region of a sensor layer, which is subsequently ion-milled and deposited with hard bias and lead layers. The thin lift-off mask is made by forming a release layer over the sensor layer; forming a hardmask layer over the release layer; forming a photoresist layer over the hardmask layer; imaging and developing the photoresist layer such that end portions of the photoresist layer are removed and a central portion of the photoresist layer remains; reactive ion etching (RIE) the hardmask layer such that end portions of the hardmask layer are removed and a central portion of the hardmask layer remains; stripping the central portion of the photoresist layer; and etching the release layer such that end portions of the release layer are removed and a central portion of the release layer remains. The hardmask layer may be made from a highly-etch-resistant material, such as silicon, titanium, or tantalum. The release layer may be made from, e.g., polydimethylglutarimide (PMGI) which may be RIE'd, or a metal (such as AlCu) which may be wet-etched. Using this method, shadowing can be minimized and undercut size can be sufficiently controlled for defining narrow track widths.

15 Claims, 7 Drawing Sheets

(ABS)

METHOD OF FORMING A READ SENSOR USING A LIFT-OFF MASK HAVING A HARDMASK LAYER AND A RELEASE LAYER

BACKGROUND OF THE INVENTION

1. Field of the Invention

This invention relates generally to methods of forming a read sensor for a magnetic head using a lift-off mask, and more particularly to a method of forming a read sensor for a magnetic head using a lift-off mask which includes a hardmask layer and a release layer.

2. Description of the Related Art

Magnetic head assemblies are typically made of multiple thin film layers which are patterned to form various shaped layers in the head. Some of the layers are plated while other layers are sputter deposited on a wafer substrate. The read head portion of a magnetic head assembly includes multiple layers that are typically sputter deposited. For example, the multiple layers of a read sensor, hard bias and lead layers connected to the read sensor, and first and second read gap layers below and on top of the read sensor are typically sputter deposited.

One prior art method of forming shaped sputter deposited layers is to sputter deposit a full film layer of the required material on a wafer substrate, form a patterned photoresist layer on the layer, ion mill away the exposed portion of the layer and then remove the photoresist layer leaving the desired shaped layer that was protected therebelow. This first conventional method of shaping sputter deposited layers has been generally superseded by a second conventional method which utilizes a bilayer lift-off mask scheme.

The bilayer lift-off mask used in the second conventional method has a T-shape (as seen in cross-section) wherein the vertical portion of the T is short and wide but less wide than the horizontal top portion of the T. The top portion of the T is generally a patterned photoresist layer and the bottom vertical portion of the T is a release layer. This configuration provides first and second undercuts (as seen in cross-section) wherein each undercut has a height and a length below the top photoresist portion.

In this method, the bilayer lift-off mask is employed for the purpose of making contiguous junctions of the first and second lead layers with first and second side edges respectively of the read sensor. Multiple read sensor layers are sputter deposited in full film on the wafer substrate followed by formation of the bilayer lift-off mask covering a read sensor site. Ion milling is then employed to remove all of the read sensor material except that below the mask. Full films of hard bias and lead layer materials are then sputter deposited which cover the top of the lift-off mask and an area surrounding the lift-off mask. It is important that the height and length of the undercuts is sufficient such that a photoresist stripper can reach the bottom release layer. The stripper is then introduced to dissolve the bottom release layer after the hard bias and lead layer depositions. This causes the bilayer lift-off mask and the hard bias and lead materials deposited thereon to be released from the wafer substrate leaving the aforementioned contiguous junctions between the first and second lead layers and the first and second side edges respectively of the read sensor.

The bilayer lift-off mask scheme significantly improves the making of read heads by forming contiguous junctions between the lead layers and the read sensor. Fewer processing steps are required and the profile of the lead and hard bias layers above the read sensor has been reduced. Unfortunately, however, many bilayer lift-off masks using this conventional methodology are better suited for the construction of read heads with a track width of greater than approximately 0.2 microns. The more narrow the track width, the greater the tracks per inch (TPI) that can be read by the read head from a rotating magnetic disk. Accordingly, the greater the tracks per inch the greater the storage capacity of a disk drive employing such a read head.

Using such conventional methods, processing control of the length and height of the undercut has not been precise enough for very narrow track widths. Long first and second undercuts leaves insufficient release layer material which causes the bilayer lift-off mask to be separated from the substrate or topple over during subsequent processing steps of ion milling and sputter deposition. If the undercut is too short, fencing can occur. Fencing is the deposition of sputtered material across the height of the undercut that remains after the photoresist is removed. These particular problems have generally been caused by photoresist developers of strong normality which are employed to pattern the release layer. Because of the rapid removal of the release layer portion by photoresist developers of high normality, such as tetramethylammonium hydroxide (TMAH), 0.26N, or aqueous potassium hydroxide (KOH), 0.3–0.4N, it has been difficult to precisely stop the removal of the release layer portions forming the aforementioned undercuts.

Several other problems exist in forming read sensors using these methods. Typical processing of prior art bilayer lift-off masks has been to treat a single layer of photoresist with ultraviolet or an electron beam to a particular depth. Unfortunately, the penetration depth of the beam has not been precise enough to form a highly-defined bottom release layer portion of a single resist layer. The height control is important for a successful lift-off process for a given hard bias and lead thickness. Still a further problem with the present processing of bilayer lift-off masks is that the ion milling step reduces the width of the top photoresist layer portion. This reduction undesirably reduces the track width of the read head in an uncontrolled manner.

Variations of the lift-off mask scheme have improved the formation of the read sensor and solved some of these problems to a limited extent. In U.S. Pat. No. 6,218,056 B1, for example, the lift-off mask is subjected to an electron beam for decreasing the molecular weight of the release layer and increasing the weight of the photoresist layer so that a weak developer can be employed for patterning the release layer which does not alter the track width of the photoresist layer for better control.

Using any one of the above-processes, however, the existence of a photoresist layer in the lift-off mask during the ion milling and deposition processes places a limit on how narrow the track width of the read sensor can be. Commercially available photoresists are thicker than 3000 Angstroms. Unfortunately, in such cases, a thick top photoresist layer causes shadowing where a read sensor having relatively long side edges with gradual slopes is formed. However, a preferred read sensor has short side edges with steep slopes for a narrow track width. The widths of today's magnetic heads are approaching 0.1–0.2 $\mu$m.

Accordingly, there is a strong-felt need for a method of forming a read sensor using a lift-off mask that is thin and sufficiently shaped so that the read sensor can have a narrow track width.

SUMMARY OF THE INVENTION

An inventive method of forming a read sensor that has a very narrow track width is described herein. The method involves forming and utilizing a unique thin lift-off mask over a central region of a sensor layer which is subsequently ion-milled and deposited with hard bias and lead layers. The lift-off mask of the present invention includes a hardmask layer and a release layer.

The lift-off mask may be made by forming a release layer over a sensor layer; forming a hardmask layer over the release layer; forming a photoresist layer over the hardmask layer; imaging and developing the photoresist layer such that end portions of the photoresist layer are removed and a central portion of the photoresist layer remains; reactive ion etching (RIE) the hardmask layer such that end portions of the hardmask layer are removed and a central portion of the hardmask layer remains; stripping the central portion of the photoresist layer; and etching the release layer such that end portions of the release layer are removed and a central portion of the release layer remains.

The hardmask layer is made up of a highly-etch-resistant material, such as, but not limited to, silicon, titanium, or tantalum. The release layer is made up of materials such as, but not limited to, polydimethylglutarimide (PMGI) which may be RIE'd, or a metal (such as AlCu) which may be wet-etched. Using the method described herein, shadowing can be minimized and undercut size can be adequately controlled for very narrow track widths.

BRIEF DESCRIPTION OF THE DRAWINGS

Other objects and advantages of the invention will become more apparent to those skilled in the art after considering the following detailed description in connection with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
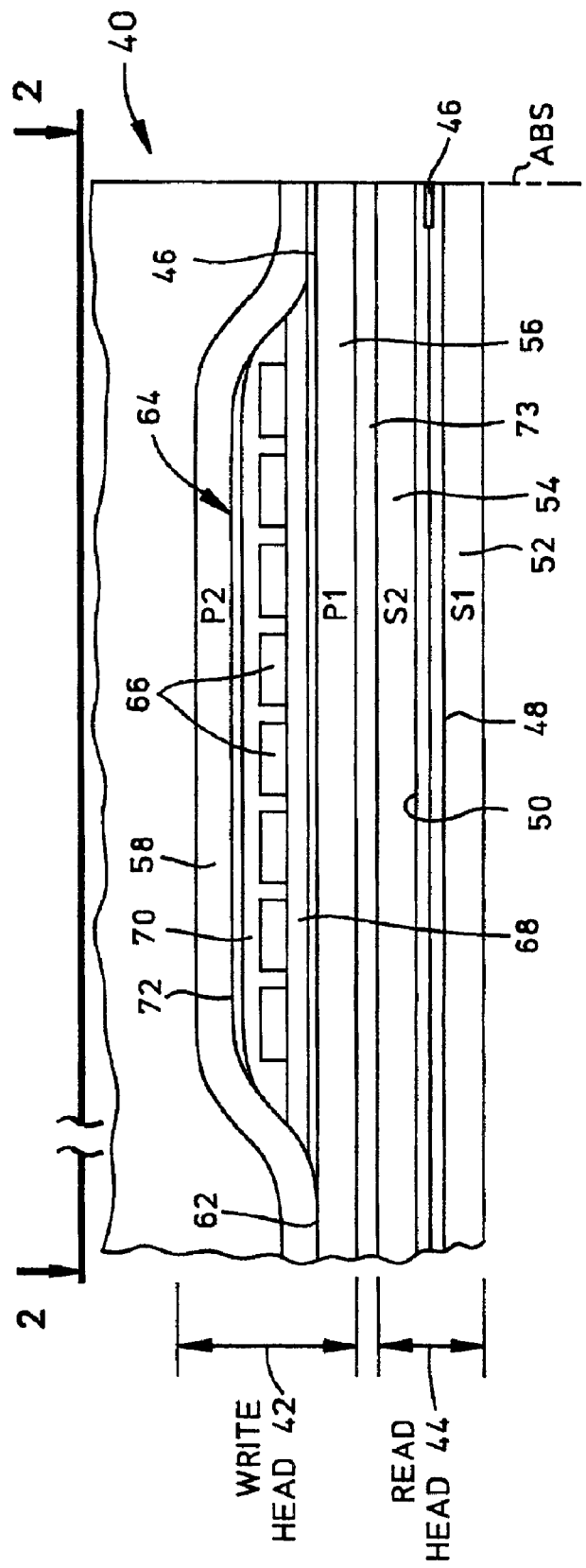
FIG. 1 is a longitudinal cross-sectional view of a portion of a magnetic head assembly including a read head and a write head.

FIG. 1 shows a magnetic head assembly 40 which has a write head portion 42 and a read head portion 44. Read head portion 44 includes a multilayered read sensor 46 which is located between nonmagnetic electrically insulative first and second read gap layers 48 and 50. First and second lead layers, which will be described in more detail hereinafter, are connected to first and second side edges of read sensor 46. Read sensor 46 and the first and second lead layers are located between nonmagnetic electrically insulative first and second read gap layers 48 and 50. In a merged magnetic head assembly, a second shield layer 54 also serves as a first pole piece layer 56 of the write head.

Figure 2:
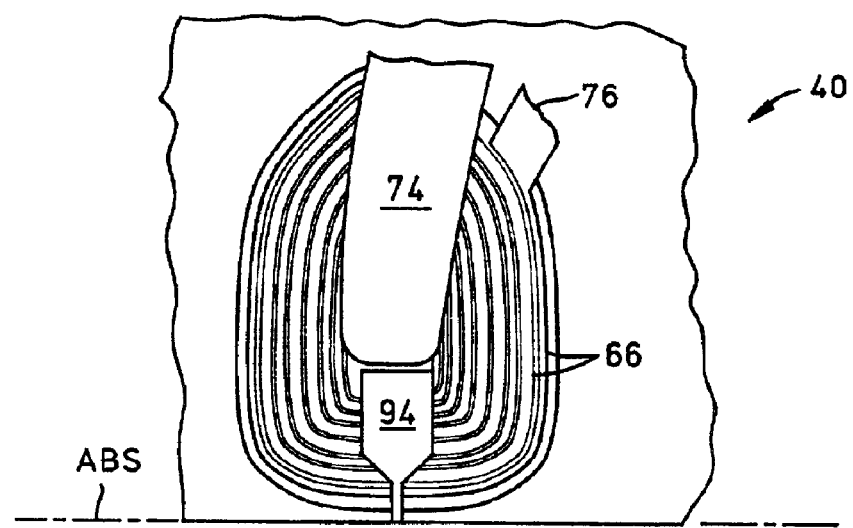
FIG. 2 is a view taken along plane 2—2 of FIG. 1 with all layers above the first insulation layer of the insulation stack removed except the coil layer, first and second leads for the coil layer and a second pole piece layer.

Write head portion 42 includes first and second pole piece layers 56 and 58 wherein second pole piece layer 58 is separated from first pole piece layer 56 by a nonmagnetic write gap layer 60 in the pole tip region and is connected to first pole piece layer 56 at a back gap 62 in a back gap region. Between the pole tip and back gap regions is a yoke region where an insulation stack 64 is located between first and second pole piece layers 56 and 58. Embedded within the insulation stack 64 is a pancake-shaped coil 66 which is located between first and second insulation layers 68 and 70 of the insulation stack and is capped by a third insulation layer 72 to smooth out ripples caused by the coil layer 66. First pole piece layer 56 is separated from second shield layer 54 by a nonmagnetic layer 73. Since first pole piece layer 56 is separated from second shield layer 54, this type of head is known in the art as a piggyback head. When first pole piece layer 56 and second shield layer 54 are a common layer, this is known in the art as a merged head. FIG. 2 is a top view of FIG. 1 which is extended to show the back portion of the write coil 66 with first and second leads 74 and 76 that are connected to the coil layer and that provide a write current thereto.

Figure 3:
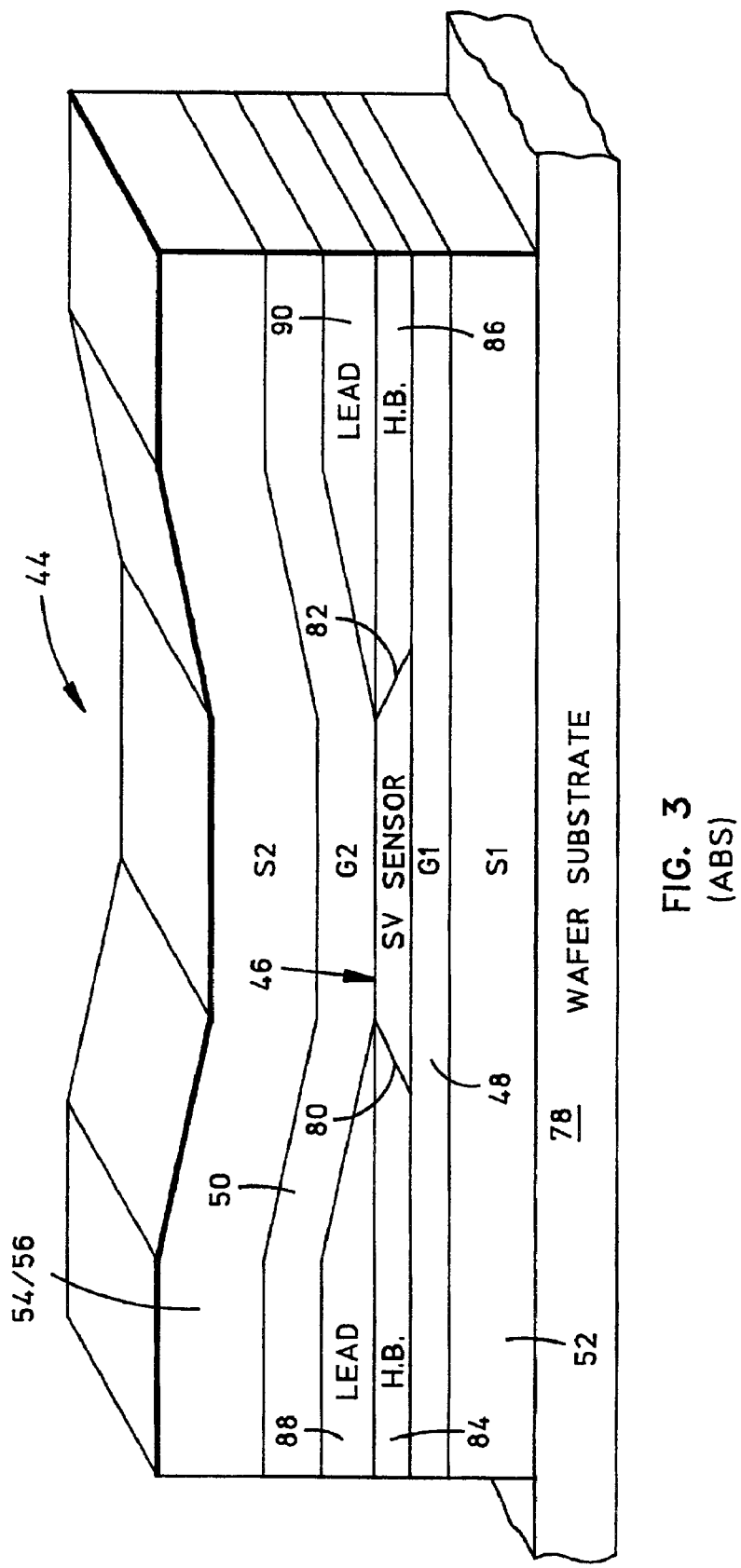
FIG. 3 is an air bearing surface (ABS) isometric schematic illustration of the read head portion of the magnetic head assembly of FIG. 1.

FIG. 3 is an enlarged isometric ABS illustration of read head portion 44 of magnetic head assembly in FIG. 1 which is constructed on a wafer substrate 78. Multilayered sensor 46 has first and second side edges 80 and 82 that are connected to first and second hard bias layers (HB) 84 and 86 and first and second lead layers 88 and 90. This type of connection is known in the art as a contiguous junction which is fully described in U.S. Pat. No. 5,018,037.

Figure 4:
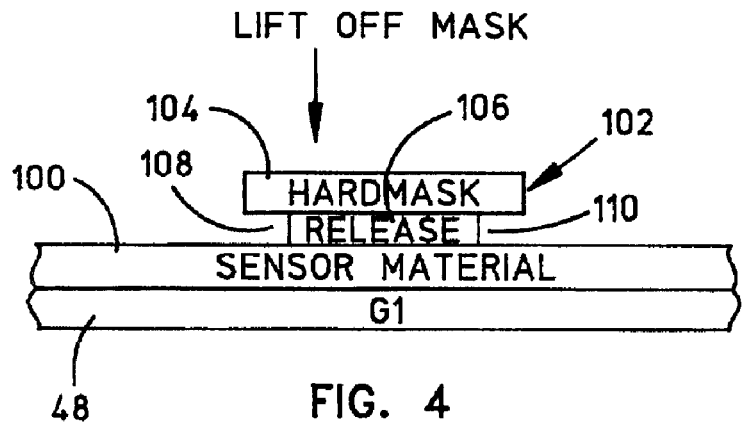
FIG. 4 is an ABS illustration of the first step in forming a lift-off mask on top of multiple sputtered thin films of sensor material.

The read sensor and the contiguous junction are formed in accordance with the present invention using a special lift-off mask and the process steps shown in FIGS. 4–7. In FIG. 4, the first steps in making a contiguous junction between the read sensor and first and second hard bias and lead layers are illustrated. After sputter depositing multilayers of sensor material 100 on first gap layer 48, a lift-off mask 102 is formed on top of a sensor material layer 100 in a region where the read sensor is to be formed. Lift-off mask 102 includes a top hardmask layer 104 and a bottom release layer 106. Release layer 106 has first and second side edges which are recessed below hardmask layer 104 to provide first and second undercuts 108 and 110 below hardmask layer 104.

Figure 5:
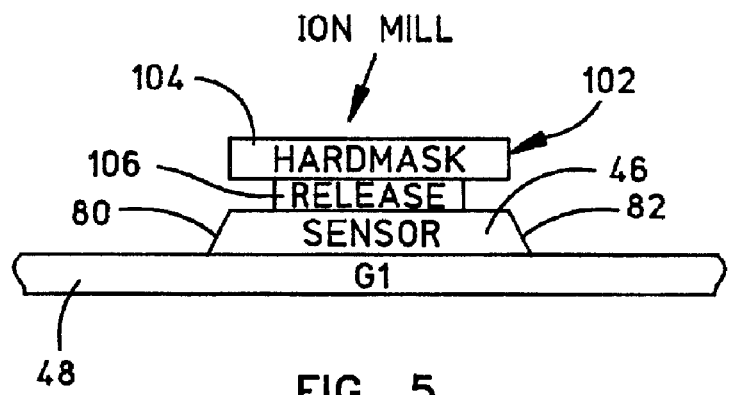
FIG. 5 is the same as FIG. 4 except ion milling has been employed to remove exposed portions of sensor material about the mask.
Figure 6:
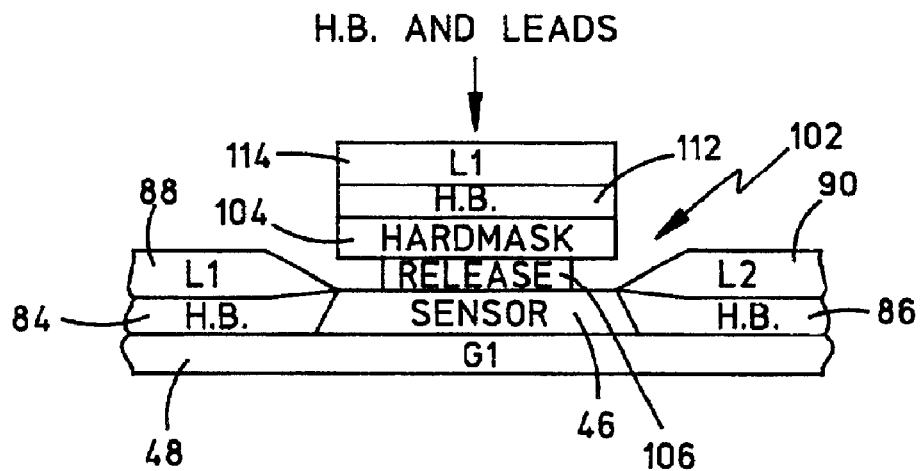
FIG. 6 is the same as FIG. 5 except first and second hard bias and lead layers have been sputter deposited over the entire wafer as well as on top of the mask.
Figure 7:
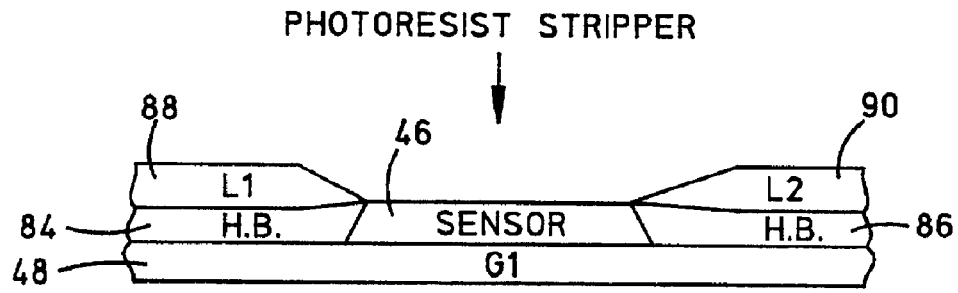
FIG. 7 is the same as FIG. 6 except the mask has been removed with a stripper which also removes the material sputter deposited on top of the mask.

As shown in FIG. 5, ion milling is employed to remove all of the sensor material except for a portion of the sensor material layer below lift-off mask 102 so as to form read sensor 46 having first and second side edges 80 and 82. First and second side edges 80 and 82 slope slightly outwardly because of the angle of the ion milling and a minimal shadowing effect of lift-off mask 102. As illustrated in FIG. 6, a full film of hard bias material 84 and 86 is sputter deposited followed by sputter deposition of a full film of lead material 88 and 90. Because of the full film sputter deposition, a portion of hard bias material layer 112 and a portion of lead material layer 114 are formed on top of lift-off mask 102. In FIG. 7, the wafer is subjected to a photoresist stripper which dissolves release layer 106 and releases lift-off mask 102 with layers 112 and 114 thereon so as to form contiguous junctions between first and second side edges 80 and 82 of the read sensor and hard bias layers 84 and 86 and first and second lead layers 88 and 90.

In contrast with that described in relation to FIGS. 4–7, prior art methodologies utilize a lift-off mask consisting of a top photoresist layer and a bottom release layer. However, commercially available photoresists are thicker than 3000 Angstroms. Unfortunately, such a thick top photoresist layer causes shadowing where the read sensor is formed with relatively long side edges having gradual slopes.

According to one process utilizing the prior art lift-off mask, a relatively strong photoresist developer is employed for removing exposed portions of release layer 106 to form the configuration shown in FIG. 4. However, this results in poor process control of the length of undercuts 108 and 110 below the top photoresist layer. Because of this lack of process control it is difficult to form sensors 46 with very narrow track widths. Another problem is that during the ion milling step in FIG. 5, the width between the side edges of the top photoresist layer are ion milled away to reduce this width which equates to an unpredictable track width of sensor 46.

Figure 8:
FIG. 8 is a cross-sectional elevation view of the first steps in the process of making a lift-off mask which comprises the steps of coating a release layer over a sensor layer, a hardmask layer over the release layer, and a photoresist layer over the hardmask layer.
Figure 14:
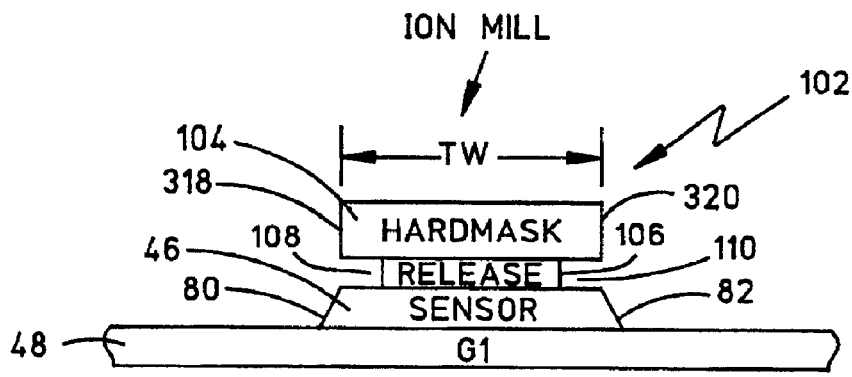
FIG. 14 is the same as FIG. 13 except side edges of the sensor have been formed by ion milling away exposed portions of the sensor material layer.
Figure 15:
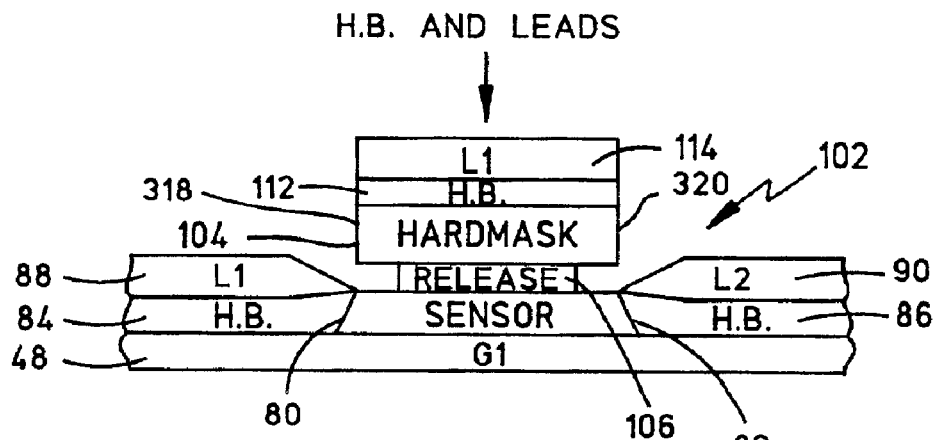
FIG. 15 is the same as FIG. 14 except hard bias and lead layers have been sputter deposited over the entire wafer as well as on top of the central portion of the photoresist layer.
Figure 16:
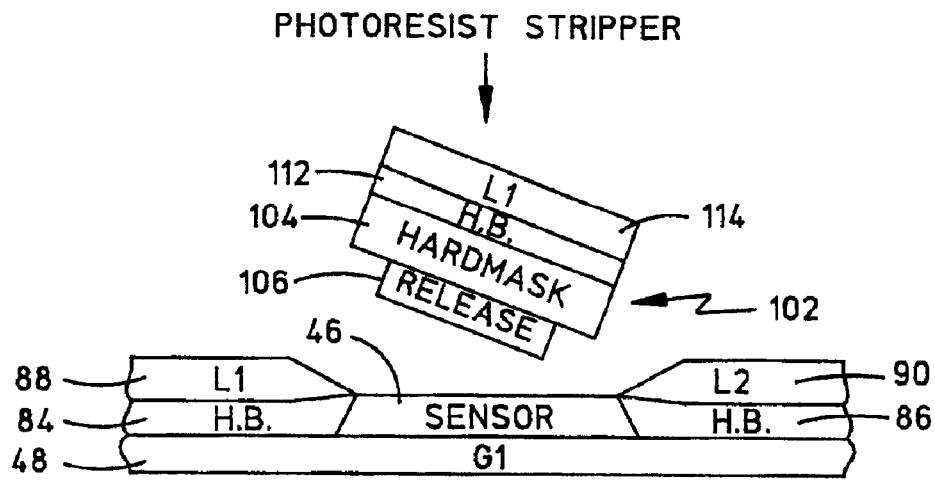
FIG. 16 is the same as FIG. 15 except a stripper has been employed to dissolve the release layer to release the lift-off mask from the wafer along with the layers sputter deposited thereon.

The present process of forming lift-off mask 102 of FIG. 4 and read sensor 46 of FIGS. 7 and 16 is illustrated in FIGS. 8–16. As shown in FIG. 8, conventional sensor material layers 100 are sputter deposited over gap layer 48 which is formed over a substrate. After forming this full film of multi-thin film layers, a release layer 300 is formed over sensor material layer 100. Release layer 300 may also be referred to as a lift-off layer. Release layer 300 may be or include a material such as, but not limited to, polydimetyhlglutarimide (PMGI), a metal such as aluminum-copper (AlCu), or materials high in tungsten (W). Release layer 300 may be coated to a specified thickness within the range of about 200–1200 Angstroms, or preferably to a specific thickness of about 600 Angstroms. If using materials high in tungsten, this material is made such that it does not intermix with resists such as polyimide, polyarylethers, or lightly cross-linked Novalak.

Next in FIG. 8, a hardmask layer 302 is formed over release layer 300. Hardmask layer 302 is or includes a highly etch-resistant material which may be formed by sputter deposition, chemical vapor deposition (CVD), or a spin-on-glass (SOG) technique. Hardmask layer 300 is formed to a specified thickness within the range of about 600–2000 Angstroms, or preferably to a specific thickness of about 1000 Angstroms. More generally, hardmask layer 300 should be thick enough so that it is not entirely removed during subsequent ion milling (later in relation to FIG. 14) of sensor material 100.

SOG is a mixture of silicon-dioxide ($SiO_2$) and dopants (e.g., typically boron or phosphorous) suspended in a solvent solution and typically applied to a silicon wafer by spin-coating similar to that which is done with photoresist. For hardmask layer 302, the SOG approach can utilize conventional silicon containing precursors or other highly etch-resistant materials, such as titanium. On the other hand, silicon containing photoresist can also be utilized which can be oxidized to a glass via $O_2$ plasma (after development and etching) to form an alternative hardmask.

Continuing with FIG. 8, a top photoresist layer 304 is formed over hardmask layer 302. Photoresist layer 302, which may be a polyphenolic polymer or polyvinylphenol, may be spun on top of hardmask layer 302. A polyphenolic polymer is a copolymer of phenol and formaldehyde. Polyphenolic polymer is also known commercially as Novolak, which can be purchased from Hoechst Celanese, Sumitomo, or Shipley. This photoresist layer 304 may be formed to a thickness within the range of about 2000–5000 Angstroms, or preferably to a specific thickness of about 3500 Angstroms.

Thus, the initial multilayer structure for the lift-off mask shown in FIG. 8 includes release layer 300 over sensor material layer 100, hardmask layer 302 over release layer 302, and resist layer 304 over hardmask layer.

Figure 9:
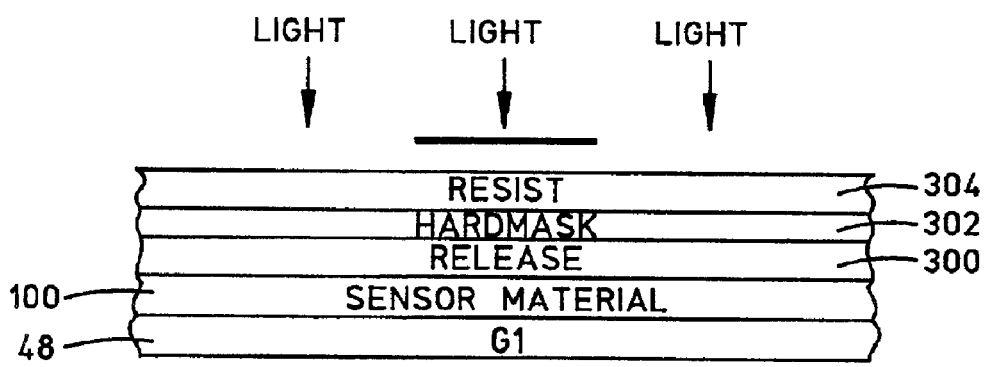
FIG. 9 is the same as FIG. 8 except the top photoresist layer has been light exposed in regions that are to be removed by a developer.
Figure 10:
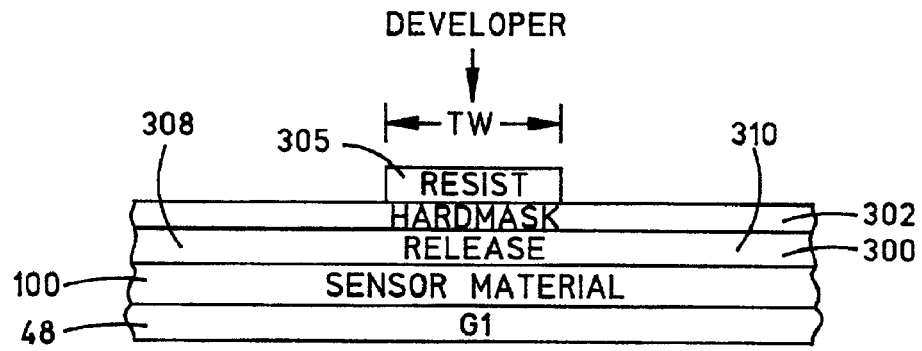
FIG. 10 is the same as FIG. 9 except the light-exposed portions of the photoresist layer have been removed by the developer, leaving a central portion of the photoresist layer.

As illustrated in FIG. 9, photoresist layer 304 is light-exposed in regions which are to be removed, provided the photoresist is a positive photoresist. If the photoresist is a negative photoresist, it is light exposed in the regions that are to be retained. In FIG. 10, the layers are subjected to a basic developer solution. As a result, only a central portion of photoresist layer 305 is left formed over hardmask layer 302. This leaves end portions 308 and 310 of hardmask layer 302 beyond photoresist layer 305 exposed. The developer used may be, for example, aqueous potassium hydroxide (KOH) developer, such as 1:6 2401 (Shipley) or 1:4 AZ 400 K (Hoechst Celanese) wherein the ratios are the developer to water. In a 1:6 2401 developer, the develop time can be up to 3 minutes for the purpose of removing light-exposed photoresist portions and leaving a photopatterned hardmask layer 302. Other basic aqueous developers may be utilized as well, such as 2.38% tetramethylammonium hydroxide (TMAH).

Figure 11:
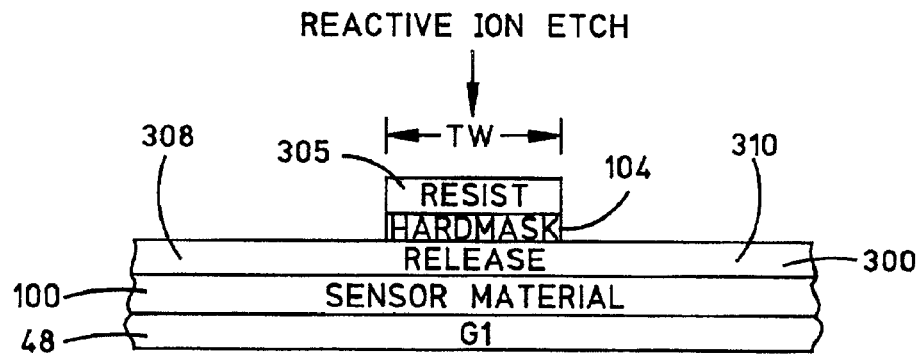
FIG. 11 is the same as FIG. 10 except the hardmask layer has been subjected to reactive ion etching (RIE) to remove end portions of the hardmask layer, leaving a central portion of the hardmask layer.

In FIG. 11, reactive ion etching (RIE) is employed to remove end portions 308 and 310 of hardmask layer 302. Only a central portion of hardmask layer 104 underneath photoresist layer 305 remains to thereby expose end portions 308 and 310 of release layer 300. The RIE may be performed using any suitable etch gas, such as one containing fluorine (e.g., CHF$_3$, C$_3$F$_8$, or CF$_4$). This step along with hardmask layer 104 advantageously provides a high-etch selectivity over release layer 300.

Figure 12:
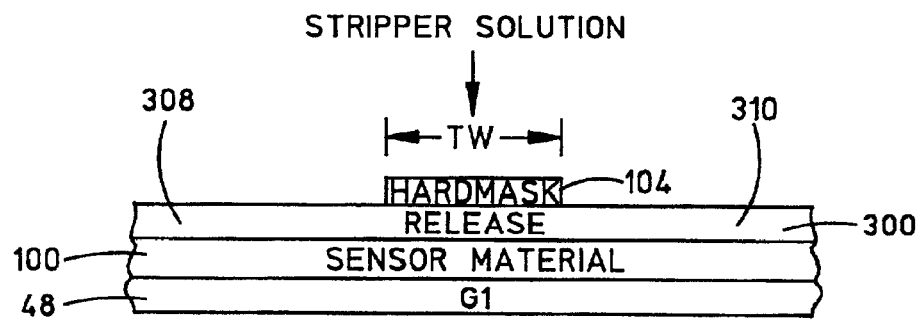
FIG. 12 is the same as FIG. 11 except the central portion of the photoresist layer has been removed with a photoresist stripper.
Figure 13:
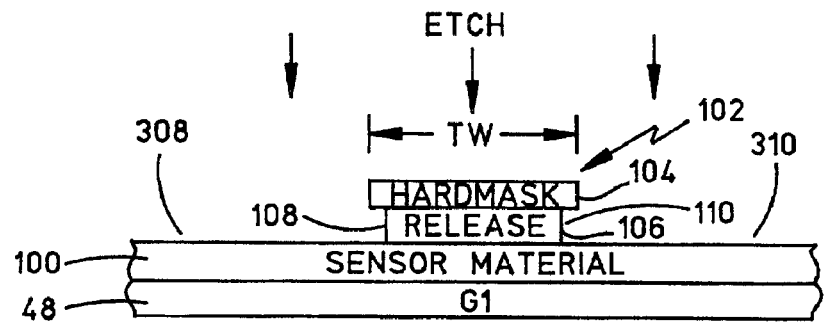
FIG. 13 is the same as FIG. 12 except that etching has been employed for removing the uncovered portion of the release layer, as well as undercut portions of the release layer, below the hardmask layer.

In FIG. 12, a conventional stripper solution is utilized to remove the central portion of photoresist layer 305. Thus, only the central portion of hardmask layer 104 remains over the full release layer 300 to expose end portions 308 and 310 of release layer 300. In FIG. 13, further etching is employed in order to remove these first and second end portions 308 and 310 of release layer 300. This etching also removes first and second portions of release layer 300 that lie directly below top photoresist layer 104, which are referred to as first and second undercuts 108 and 110. Thus, a patterned release layer 106 that is recessed from the first and second side edges of hardmask layer 104 is formed. The resulting lift-off mask 102 over sensor material layer 100 is produced.

If the release layer material is PMGI, the release layer material may be etched using the reactive ion etching (RIE) described in relation to FIG. 11. A further possibility is that this RIE etch of the release layer may also be used to remove the imaging photoresist layer in place of the wet-strip step. On the other hand, if the release layer material includes a metal, wet-etching may be employed using a conventional developer solution. The developer utilized may be an AZ developer, which may be purchased from Hoechst Celanese. This developer consists of sodium hydroxide buffered with a phosphoric acid, trisodium salt and silicic acid, sodium salt. It should be noted that the thickness of the release layer 300 in FIG. 8 is maintained in the patterned bottom release layer 312 in FIG. 13 so as to precisely define the height of the first and second undercuts 314 and 316. The length of the undercut can be precisely controlled by the amount of time that the developer is left in place to remove release layer portions below hardmask layer 104. For very narrow track widths, an air bridge structure which supports hardmask layer 104 may be formed wherein the entire release layer 106 in the central region of the cross-section is removed.

The size and shape of lift-off mask 102 is important as it determines the shadowing during ion milling and deposition. As one example, lift-off mask 102 of FIG. 13 is formed to have the following additional physical characteristics. Hardmask layer 104 has a thickness of about 1000 Angstroms and release layer 106 has a thickness of about 600 Angstroms. The sidewalls of hardmask layer 104 are smooth (free of features) and slope slightly outwardly at an angle of about 20–30 degrees. The bottom corners of hardmask layer 104 are sharp, as round corners effectively increase the thickness. The length of each one of undercuts 108 and 110 is about 500–1000 Angstroms, and the shape of each one is rectangular.

In FIG. 14, ion milling is employed to remove all portions of sensor material 100 (FIG. 13) except for read sensor 46 having first and second sloping side edges 80 and 82. Advantageously, first and second side edges 80 and 82 are short and have steep slopes. In FIG. 15, hard bias and lead layer materials are sputter deposited to form first and second hard bias layers 84 and 86 and first and second lead layers 88 and 90. These layers make contiguous junctions with first and second side edges 80 and 82 of read sensor 46. Hard bias layer portion 112 and lead layer portion 114 are also formed on top of hardmask layer 104.

In FIG. 16, the wafer substrate is subjected to a photoresist stripper for dissolving release layer 107 and releasing photoresist layer 104 and the others from the wafer substrate. An exemplary photoresist stripper for release layer 106 is N-methyl pyrrolidone (NMP). Read sensor 46, first and second hard bias layers 84 and 86, and first and second lead layers 88 and 90 in FIG. 16 are the same as the read sensor, first and second hard bias layers, and first and second lead layers in FIGS. 3 and 7.

As a further advantage, the metal release and SOG layer materials in the lift-off mask can provide for optical properties sufficient to be considered antireflective layers so that standing waves within the photoresist layer can be eliminated to better control the uniformity of critical dimensions (CDs). Conventionally, antireflective layers are often provided to prevent reflection of light that is transmitted through the photoresist, reflected off the substrate, and back into the photoresist where it can interfere with incoming light and cause the resist to be unevenly exposed. Referred to as bottom anti-reflective coatings (BARCs), such layers are currently used in applications where it is important to keep tight control over CDs.

Thus, an inventive method of forming a read sensor with a very narrow track width has been described. The method involves forming and utilizing a unique thin lift-off mask over a central region of a sensor layer which is subsequently ion-milled and deposited with hard bias and lead layers. The lift-off mask includes a hardmask layer and a release layer. The lift-off mask may be made by forming a release layer over the sensor layer; forming a hardmask layer over the release layer; forming a photoresist layer over the hardmask layer; imaging and developing the photoresist layer such that end portions of the photoresist layer are removed and a central portion of the photoresist layer remains; reactive ion etching (RIE) the hardmask layer such that end portions of the hardmask layer are removed and a central portion of the hardmask layer remains; stripping the central portion of the photoresist layer; and etching the release layer such that end portions of the release layer are removed and a central portion of the release layer remains. The hardmask layer is formed of a highly etch-resistant material, such as silicon, titanium, or tantalum. The release layer is formed of, e.g., polydimethylglutarimide (PMGI) which may be RIE'd, or a metal (such as AlCu) which may be wet-etched using a developer solution. Using the method described herein, shadowing can be minimized and the undercut can be adequately controlled for defining very narrow track widths.

The above-described method solves many of the issues with track width definition for current and future read heads. For one, shadowing during the ion milling and deposition can be dramatically reduced or eliminated. Also, better control of the undercut is achieved. In addition, the use of a metal release layer gives a wide range of thickness utilization compared to the fixed photoresist thickness. The thickness of the release layer can be better controlled in a more separate and independent fashion. Furthermore, use of the metal release layer and SOG may eliminate standing waves within the photoresist layer. In accordance with the invention, significantly improved contiguous junctions are formed.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A method of forming a read sensor for a magnetic head, comprising:

forming a lift-off mask over a central region of a sensor layer, the lift-off mask comprising a hardmask layer over a release layer;

the hardmask layer being a highly etch-resistant material comprising one of silicon, titanium, and tantalum;

ion milling the sensor layer, with the lift-off mask in place, such that the end portions of the sensor layer are removed and a central portion of the sensor layer remains;

depositing lead layers adjacent to the central portion of the sensor layer; and dissolving the release layer to remove the lift-off mask.

2. The method of claim 1, wherein the release layer comprises a metal.

3. The method of claim 1, wherein the release layer comprises a metal which serves as a bottom antireflective coating (BARC).

4. The method of claim 1, wherein the release layer comprises polydimethylglutarimide (PMGI).

5. The method of 1, wherein the act of forming the lift-off mask comprises:

forming an initial multi-layer structure over the sensor layer, the initial multi-layer structure comprising a photoresist layer over the hardmask and release layers;

imaging and developing the photoresist layer such that end portions of the photoresist layer are removed and a central portion of the photoresist layer remains; and etching the hardmask layer such that end portions of the hardmask layer are removed and a central portion of the hardmask layer remains.

6. The method of claim 5, wherein the act of etching the hardmask layer comprises reactive ion etching.

7. The method of claim 5, comprising the further acts of:

removing the central portion of the photoresist layer; and etching the release layer such that end portions of the release layer are removed and a central portion of the release layer remains.

8. The method of claim 1, wherein the hardmask layer is formed to a thickness of between 600–2000 Å.

9. A method of forming a read sensor for a magnetic head, comprising:

forming a release layer over a sensor layer;

forming a hardmask layer over the release layer;

forming a photoresist layer over the hardmask layer;

imaging and developing the photoresist layer such that end portions of the photoresist layer are removed and a central portion of the photoresist layer remains;

etching the hardmask layer such that end portions of the hardmask layer are removed and a central portion of the hardmask layer remains;

stripping the central portion of the photoresist layer; and etching the release layer such that end portions of the release layer are removed and a central portion of the release layer remains, to thereby produce a lift-off mask comprising the central portions of the hardmask and release layers.

10. The method of claim 9, further comprising:

ion milling the sensor layer such that end portions of the sensor layer are removed and a central portion of the sensor layer remains;

forming hard bias and lead layers adjacent to the central portion of the sensor layer; and dissolving the release layer to remove the lift-off mask.

11. The method of claim 9, wherein the hardmask layer comprises one of silicon, titanium, and tantalum.

12. The method of claim 9, wherein the release layer comprises one of metal and polydimethylglutarimide (PMGI).

13. The method of claim 9, wherein the act of etching the hardmask layer comprises reactive ion etching.

14. The method of claim 9, wherein the release layer comprises a metal.

15. The method of claim 9, wherein the act of etching the release layer comprises wet-etching.

* * * * *